UNITED STATES PATENT OFFICE.

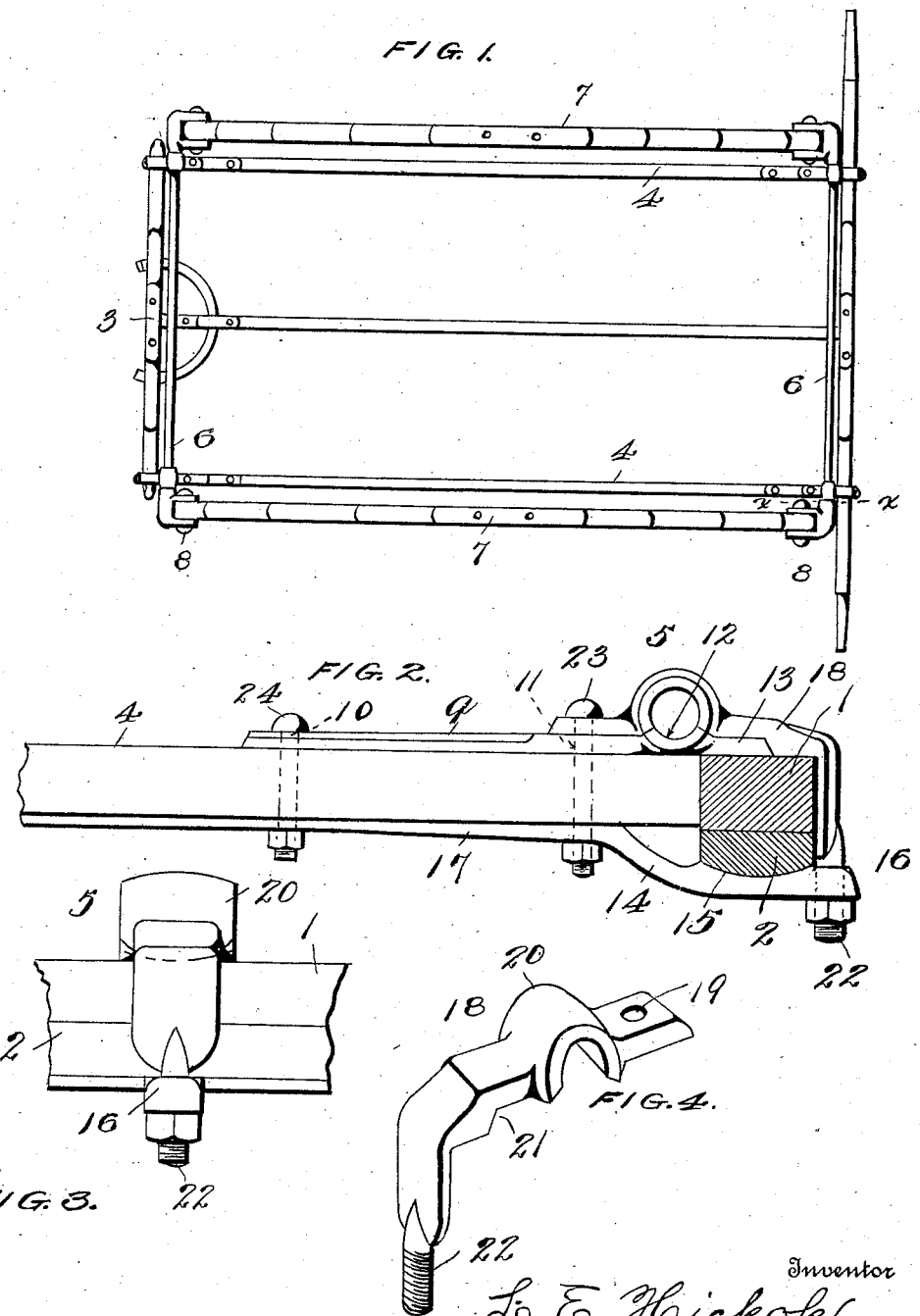

LESTER E. HICKOK, OF CLEVELAND, OHIO, ASSIGNOR OF ONE-HALF TO THE CLEVELAND HARDWARE COMPANY, OF CLEVELAND, OHIO.

MEANS FOR DETACHABLY SUPPORTING VEHICLE EQUALIZER-BARS.

974,144.  Specification of Letters Patent.  Patented Nov. 1, 1910.

Application filed October 2, 1909. Serial No. 520,641.

*To all whom it may concern:*

Be it known that I, LESTER E. HICKOK, a citizen of the United States, residing at Cleveland, in the county of Cuyahoga and State of Ohio, have invented certain new and useful Improvements in Means for Detachably Supporting Vehicle Equalizer-Bars, of which the following is a specification.

When side semi-elliptic springs with their ends pivotally attached to equalizer bars or rods have been employed heretofore to support vehicle bodies, the bars or rods have been journaled in integral equalizer sockets secured to the reach ends and the rear axle, or bed and axle, and to the head block. The end of the socket has been perforated to receive a bolt which bolt has generally been passed through the axle, or bed and axle, and head block. The holes in the axle and head block have weakened the same so they have broken on sectional lines through the bolt holes. Further, as the forked equalizer ends could not be passed through the holes in the sockets, the equalizer bars or rods have been made in two parts, the socket irons slipped on to the bars or rods and then the adjacent ends of the bars have been welded together, a very costly, troublesome and unmechanical process. Repairs have also been made with difficulty.

The object of my invention is to cure the imperfections of the old methods of application recited by the provision of improved means for detachably securing the equalizer bars, or an improved equalizer socket so that the necessity of welding the ends of the equalizer bars, and the perforation of the axle and head block shall be obviated; and furthermore so that an integrally fashioned equalizer bar may easily be applied and when necessary removed.

My invention consists in certain novelties of construction and combination of parts as hereinafter set forth and claimed.

The accompanying drawing illustrates an example of the physical embodiment of the invention constructed according to the best mode I have so far devised for the practical application of the principle.

Figure 1 is a top plan view of part of a vehicle running gear with the body and wheels removed. Fig. 2 is an enlarged section of Fig. 1 taken on line *x—x* with the equalizer bar removed. Fig. 3 is a rear view of Fig. 2. Fig. 4 is a view of part of the socket in perspective.

Referring to the several figures, the numeral 1 designates the rear axle bed; 2, the axle; 3, the head block; 4, the reaches or perches; 5, my improved equalizer sockets; 6, the equalizer bars or rods journaled in the sockets; and 7 are the semi-elliptic side springs pivotally connected at their ends through the medium of bolts 8 between the forked ends of the equalizer bars. The socket and the means for its attachment consists of three elements: firstly, a stay or plate 9 having two perforations 10, 11, a raised and curved seat 12 in the shape of an arc of a circle, and a projecting end 13, as shown; secondly, a yoke 14 having a curved seat 15 to fit the axle, a perforated heel, 16, and an upwardly bent and perforated end 17 in frictional contact with the under surface of the reach, and this end 17 may extend any distance beneath the reach even to the opposite end of the same and there be fashioned into the shape of a similar yoke 17, as is obvious; and, thirdly, a removable socket clip 18, having a perforated lug 19, a raised socket 20, with a bearing at its under surface in the shape of an arc of a circle the same forming with the curved seat 12 a circular bearing, a recess 21 to match the end 13, and a threaded clip end 22 which passes through the hole in the heel 16 of the yoke. Bolts 23, 24 are passed through the lug 19, the holes 10 and 11 in the plate 9, the perforated reach and the perforated end 17 of the yoke. Nuts are then applied to the bolts 23, 24, and the threaded clip end 22 of the socket clip. Obviously with this construction the equalizer bars may each be made integral and applied and removed with facility, and there are no holes through the head block and axle and axle bed to weaken the same. Where a naked rear axle is used it is to be considered as the equivalent of an axle and axle bed.

It is clear from the foregoing description taken in connection with the drawing that I have provided an improved means for detachably securing equalizer bars in position, the value and utility of which, compared with the old means for attaching said bars, will be appreciated by those familiar with the art.

What I claim is,—

1. The combination with a vehicle having a head block, axle or axle and bed, and reaches connecting the same, of the following three elements located at each of the four points where the reaches join the axle or axle and bed, and the head block, to wit: a stay 9, a yoke 14, and a removable socket clip 18; and means for securing the said elements in their proper relative positions.

2. The combination with a reach and axle or axle and bed, of a stay plate 9, a yoke 14, a removable socket clip 18, and means for securing the said parts to the reach and axle or axle and bed; the stay plate engaging the reach, the yoke engaging the reach and axle, and the clip engaging the plate and yoke.

3. An equalizer socket and means for its attachment, comprising a perforated stay or plate with a seat; a perforated yoke; and a socket clip having a bearing surface to match the seat in the stay, and a threaded end; said stay or plate being adapted to engage a reach, the yoke adapted to engage the lower surfaces of a reach and axle, and the threaded clip end of the socket clip adapted to engage the perforated yoke.

4. An equalizer socket and means for its attachment, comprising a perforated stay or plate with a seat and a projecting end; a perforated yoke with a perforated heel; and a socket clip having a curved bearing surface to match the seat in the stay, a recess to match the end of the stay, and a threaded clip end.

5. An equalizer socket comprising a separable stay and socket clip with a bearing for an equalizer bar, part of the bearing being in the stay and part in the socket clip, said socket clip being threaded at one end only, and a perforated yoke adapted to engage an axle and to be engaged by the threaded end of the socket clip.

6. Means adapted for application to a reach and axle for detachably supporting the end of an equalizer bar, comprising a perforated plate with a part bearing at one end, a perforated yoke to engage the axle, and a socket clip having at one end a part bearing matching the part bearing in the plate and the other end threaded and adapted to pass through the perforation in the yoke and receive a nut.

In testimony whereof I affix my signature in presence of two witnesses.

LESTER E. HICKOK.

Witnesses:
WILLIAM LAVINGNA,
DISRAELI ALSTON.